United States Patent [19]
Doumet

[11] Patent Number: 5,972,104
[45] Date of Patent: Oct. 26, 1999

[54] METHOD AND APPARATUS FOR PRODUCING CEMENT CLINKER

[76] Inventor: Joseph E. Doumet, Villa Joseph E. Doumet, P.O. Box 40-124 Yarze, Yarze-Baabda, Lebanon

[21] Appl. No.: 08/983,246

[22] PCT Filed: Jul. 29, 1996

[86] PCT No.: PCT/IB96/00956

§ 371 Date: Jan. 12, 1998

§ 102(e) Date: Jan. 12, 1998

[87] PCT Pub. No.: WO97/16390

PCT Pub. Date: May 9, 1997

[30] Foreign Application Priority Data

Oct. 31, 1995 [EP] European Pat. Off. .............. 95117163

[51] Int. Cl.$^6$ ...................................................... C04B 7/36
[52] U.S. Cl. ........................ 106/739; 106/740; 106/750; 432/14
[58] Field of Search ................................... 106/739, 740, 106/750; 432/14

[56] References Cited

U.S. PATENT DOCUMENTS

| | | |
|---|---|---|
| Re. 21,633 | 11/1940 | Kaiser ..................................... 106/750 |
| 2,130,626 | 9/1938 | Kaiser ..................................... 106/750 |
| 4,059,396 | 11/1977 | Dano ......................................... 432/78 |
| 4,101,337 | 7/1978 | Dano . |
| 4,174,974 | 11/1979 | Fondriest . |
| 4,461,645 | 7/1984 | Roth et al. . |
| 5,449,404 | 9/1995 | Folsberg .................................. 106/765 |
| 5,618,104 | 4/1997 | Koeberer et al. . |

FOREIGN PATENT DOCUMENTS 206422  1/1984  German Dem. Rep. .

*Primary Examiner*—Paul Marcantoni
*Attorney, Agent, or Firm*—Reising, Ethington, Barnes, Kisselle, Learman & McCulloch, P.C.

[57] ABSTRACT

The invention is related to a method and an apparatus for producing cement clinker, in which the cement clinker is first of all burnt in a burning zone and then cooled in a cooling zone, wherein the cooling takes place at least partially by the delivery of fuel and steam, characterised in that in a first cooling phase the delivered fuel is mixed with the cement clinker and initially pyrolysed and the resulting pyrolysis products have a strong endothermic reaction with the steam, so that the cement clinker is quenched in such a way that at least 95%, preferably all, of the liquid phase contained therein is transformed into glass.

15 Claims, 2 Drawing Sheets

METHOD AND APPARATUS FOR PRODUCING CEMENT CLINKER

The invention relates to a method and apparatus for producing glass portland cement clinker.

BACKGROUND OF THE INVENTION

So-called Portland Cement Clinker consists essentially of alite ($C_3S$) and belite ($C_2S$), tricalcium aluminate ($C_3A$) and tetracalcium aluminate ferrite ($C_4AF$). Further constituents are in particular free magnesium oxide as well as alkalis.

The cooling of the cement clinker influences its structure, the mineralogical composition and the properties of the cement produced therefrom. The rate of cooling of the clinker has an influence in particular on the ratio between the crystalline phase content and the glass phase content in the clinker. With slow cooling, crystal formation takes place for almost all clinker components, whilst rapid cooling impedes the crystal formation and allows the liquid phase (2,95 $Al_2O_3$+2,2 $Fe_2$+MgO+alkalis) to solidify in glass form. The proportion of liquid phase in clinkers from rotary kilns is approximately 20 to 28%.

The rapid cooling of the clinker increases in particular the sulphate resistance of the cement to sulphates (magnesium, sodium, potassium, etc.) Free alkali and MgO cristals (periclase) entering in the glass formation. This may be explained by the fact that the $C_3A$ content which is responsible of the capacity of cement to sulfates resistance, becomes part of the glass and also free alkali and MgO (periclase), due to rapid cooling of the clinker and therefore will be resistant to attack by sulfates. As free alkalis disappear, free alkalis will not anymore attack the silica in aggregates.

A cement clinker which essentially consists only of alite, belite and glass, i.e. in which $C_3A$ and $C_4AF$ are bonded in the glass, could be designated as Glass Portland Cement. It is distinguished in particular by a special capacity for resistance to environmental influences without restriction of its strength.

Although the so-called Glass Portland Cement has already been produced in the laboratory, no method has hitherto been known which permits commercial production thereof.

The necessary rate of cooling cannot be achieved with the clinker cooling processes which are known in the art, particularly with the aid of so-called grate coolers.

A method of producing active belite cement is known from DD-A-206 422. In this case the belite clinker from the rotary kiln is delivered to a first cooling stage into which brown coal dust and low-temperature exit gas contains in particular carbon dioxide and steam. This leads to gasification of the supplied fuel with steam or with carbon dioxide, these gasification reactions extracting the necessary reaction enthalpy from the cement clinker.

The object of the invention is to provide a method and apparatus for industrial production of Glass Portland Cement.

SUMMARY OF THE INVENTION

According to the invention carbonaceous fuel is delivered in the first cooling phase, mixed with the cement clinker and initially pyrolysed. The resulting pyrolysis products have a strong endothermic reaction with the steam, so that the cement clinker is quenched in such a way that at least 95%, preferably all, of the liquid phase contained therein is transformed into glass.

The gaseous pyrolysis products resulting from the pyrolysis react directly with the steam. As a result the cement clinker can be quenched from its burning temperature of the order of magnitude of 1,450° C. in a few seconds. This rapid cooling process effects the transformation of the liquid clinker constituents $C_3A$ and $C_4AF$ into glass including free alkalis and MgO (periclase).

The further cooling takes place through the generally known gasification of the fuel with steam, which also proceeds endothermically, but this takes place significantly more slowly by comparison with the reaction of the gaseous pyrolysis products with steam.

THE DRAWINGS

FIG. 1 shows a schematic representation of apparatus according to the invention and FIG. 2 shows a sectional representation along the line II—II of FIG. 1.

DETAILED DESCRIPTION

Figure 1:
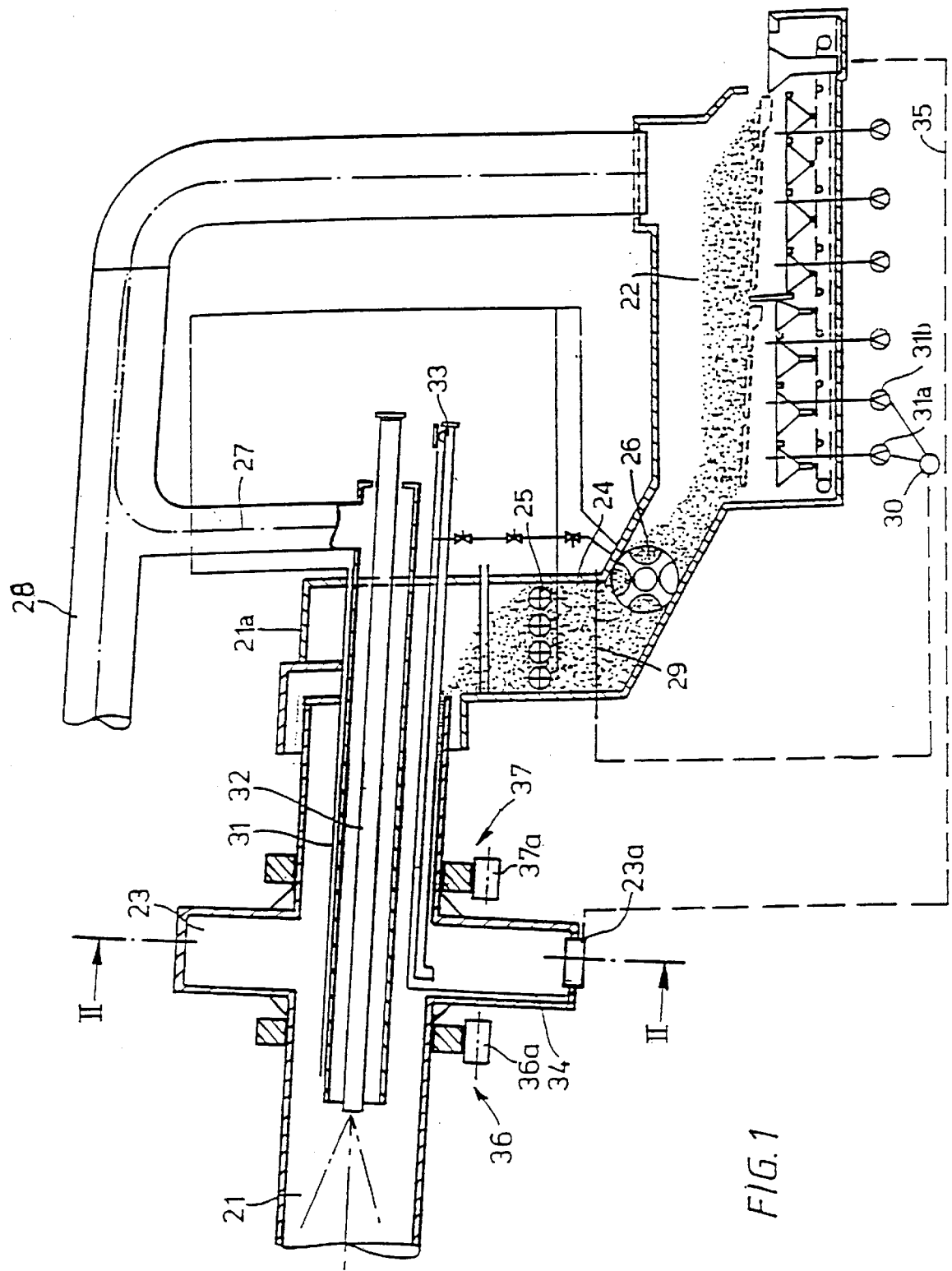
Figure 2:
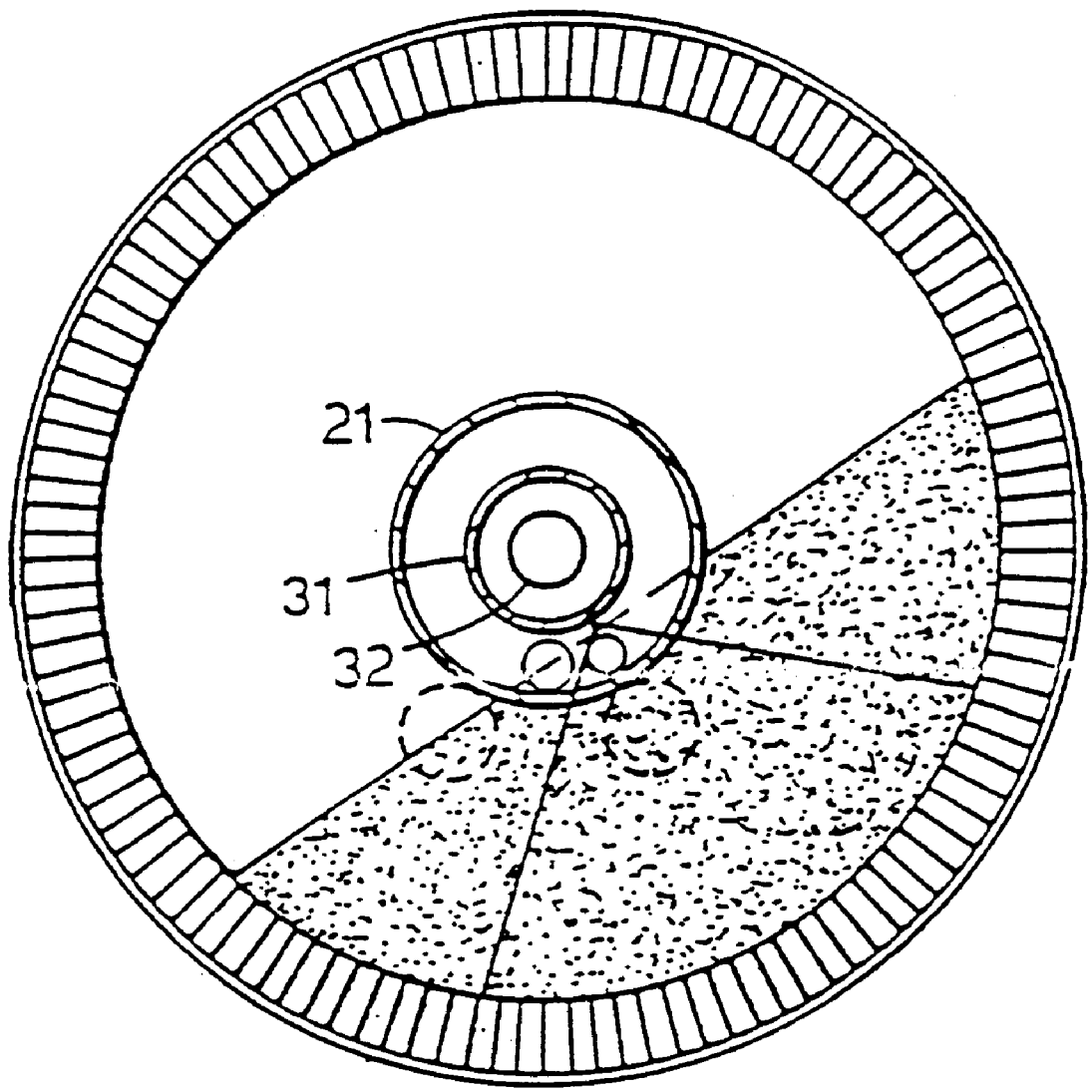

The apparatus according to the invention for producing cement clinker is described first of all with reference to FIG. 1 and 2. It consists essentially of a rotary kiln 21 for burning the cement clinker, a first cooling stage constructed as a reactor 23 and a second cooling stage constructed for example as a grate cooler 22.

In the illustrated embodiment the reactor 23 is constructed as a part of the rotary kiln 21 with enlarged diameter and is disposed at the outlet end of the kiln. The rotary kiln 21 has at its outlet or discharge end a kiln hood 21a which together with a connector 24 constitutes the transition from the kiln 21 to the grate cooler 22.

The kiln hood 21a as well as the connector 24 are constructed in the conventional manner. A crusher, preferably a roll crusher 25, which is advantageously cooled from the inside by demineralised water, is disposed in the connector 24. Here the clinker is comminuted for example to a particle size of 25 mm before it passes to a rotary vane gate 26 which delivers the clinker to the grate cooler 22. The rotary vane gate 26 is preferably also cooled from the inside with demineralised water. In the grate cooler 22 the cement clinker which has already been precooled in the reactor 23 is further cooled by means of air. The cooling air heated thereby is used in the apparatus as air for combustion in the usual way as secondary air 27 or as tertiary air 28.

A pressure-measuring device 29 is provided in the connector 24 shortly upstream of the rotary vane gate 26, and by way of a control device 30 this pressure-measuring device controls the speed of the first two fans 31a and 31b of the cooler 22 in such a way that no pressure builds up in the region of the pressure-measuring device 29.

The secondary air 27 generated by the grate cooler 22 is introduced into the rotary kiln 21 in the region of the kiln hood 21a by way of a secondary air line 31. The secondary air line 31 is of double-walled construction and is cooled with demineralised water. In the middle of the secondary air line 31 there is provided an additional burner 32 for any fuel.

The reactor illustrated in this embodiment is approximately three times greater in diameter than the rotary kiln 21, and the width of the reactor corresponds to approximately ⅓ of its diameter.

In the illustrated embodiment the rotary kiln 21 is supported in the region of the reactor 23 by way of the two supporting tire-rollers stands 36, 37 which are each disposed respectively shortly stream and shortly downstream of the reactor so as to straddle the latter. A further supporting tire-roller stand could be provided if necessary in the region of the kiln outlet. With the two supporting roller stands provided on opposite ends of the reactor 23 the additional weight due to the reactor 23 can best be distributed. Each supporting roller stand consists of two supporting rollers. In FIG. 1 supporting rollers 36a, 37a of the supporting roller stands 36, 37 can be seen.

The reactor 23 also has a screw conveyor 33 for delivery of a fuel, in particular a carbonaceous fuel. The screw conveyor is again of double-walled construction and is cooled with de-mineralized water. The feed point for the fuel lies in the inlet region of the hot bulk material into the reactor 23.

The saturated steam required in the reactor 23 is obtained completely or partially from the cooling water from the various apparatus parts described above. Furthermore, the reactor 23 has apparatus 34 for blowing steam into the cement clinker which is mixed with the fuel. This apparatus comprises a plate disposed parallel to the walls delimiting the reactor 23, the edges of the plate being chamfered in order to provide the least possible resistance for the clinker coming into the reactor. The steam will preferably stream out in the region of the base of the reactor 23.

At the lower end of the reactor 23 a closable opening 23a is also provided in order to transport the clinker located in the reactor to the cooler outlet by way of a conveyor 35, represented by broken lines, when a longer kiln stop is necessary.

In the production of cement clinker with the aid of the apparatus described above the cement clinker is first of all burnt in the rotary kiln 21 in a burning zone and then passes into the reactor 23. The fuel which is also delivered there, particularly carbonaceous fuel with a pyrolysable component, is mixed with the cement clinker in a first cooling phase and pyrolysed. The resulting pyrolysis products, such as in particular tar, light hydrocarbons with some $CO_2$ and CO, have a strong endothermic reaction with the steam which is also delivered. A particularly rapid reaction takes place between the gaseous pyrolysis products and steam, so that the cement clinker is quenched in such a way that at least 95%, preferably all, of the liquid phase contained therein is transformed into glass.

In this first cooling phase the cement clinker is quenched from the burning temperature of the order of magnitude of 1,450° C. to approximately 1,250° C., the rate of cooling in the first cooling phase being between 600K/min and 6,000K/min.

In the reaction between pyrolysis products and steam, gases such as $CH_4$, $H_2$, CO, $CO_2$ to $C_4$ hydrocarbons are produced.

In a second cooling phase, which also takes place in the reactor 23, the principal occurrence is a gasification of the delivered fuel as well as the pyrolysis products still present with steam. This gasification reaction again proceeds endothermically and extracts the necessary reaction enthalpy from the cement clinker. In the gasification the following reactions occur in particular:

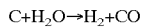

$C+H_2O \rightarrow H_2+CO$

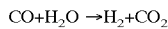

$CO+H_2O \rightarrow H_2+CO_2$

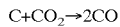

$C+CO_2 \rightarrow 2CO$

Thus in the method according to the invention for producing cement clinker the clinker is first of all quenched in a first cooling phase from approximately 1,450° C. to 1,250° C. within a few seconds. in the second cooling phase the further cooling of the cement clinker takes place principally through endothermic gasififaction. In the third cooling phase the cement clinker which has been cooled to approximately 1,000 to 1,100° C. is fed to the grate cooler.

The quantity of coal or the ratio between coal and liquid or gaseous fuel introduced in the reactor to produce through pyrolysis enough rapid gasifed products, is completely independent of the fuel needed for precalcining at the preheater outlet (before kiln-inlet). The air necessary for the combustion process is introduced into the rotary kiln by way of the secondary air line 31. The temperature of the secondary air is approximately 750° C. The additional burner 32 in the middle of the secondary air line 31 is used in particular when starting the rotary kiln and can also be used when the fuel gas produced in the reactor 23 is not sufficient for sintering the raw meal to clinker in the sintering zone.

In order to achieve the fullest possible transformation of the liquid phase into glass, a thorough mixing of the fuel with the cement clinker and the most uniform possible blowing in of steam is necessary. The apparatus 34 for introducing the steam is normally provided so as to be stationary. However, it can also be disposed so as to be movable to and fro in the direction of the rotational movement of the rotary kiln/reactor arrangement, in order to reach the most effective location for the chemical reactions.

Liquid and/or gaseous fuels react in the first cooling phase significantly more quickly than solid carbonaceous fuel, since the latter must first be broken up by pyrolysis. Therefore in order to set a sufficient rate of cooling additional fuel in liquid and/or gaseous form can be introduced into the reactor 23. Arangements similar to those used for blowing in the steam are particularly suitable for this. The rate of cooling in the first cooling phase can be set between 600K/min and 6,000K/min.

The intermixing of the delivered fuel with the cement clinker takes place particularly reliably in the reactor according to the invention. Since the reactor moves with the rotary kiln, the introduced cement clinker is constantly moving. In an advantageous embodiment the reactor can be provided internally with ceramic lifters for lifting the cement clinker. This effects an even more intensive intermixing and moreover the lifting and dropping of the cement clinker leads to comminution thereof, so that a homogenisation of the size of the cement clinker lumps takes place. This in turn ensures a uniform cooling of the cement clinker.

When the rotary kiln/reactor arrangement is being started, the additional burner 32 located in the secondary air line 31 is used. If the fuel/hydrogen ratio has adjusted to the gasification capacity of the reactor 23 the combustion process can be operated independently of the additional burner 32, in which case the fuel consumed, the regulation of the flame and the quantity of fuel delivered to the rotary kiln is independent of the fuel needed for precalcining.

With the aid of the reactor 23 described above the hot bulk material passes into the cooler having already been precooled, so that the entire quantity of air to be used in the cooler can be used as secondary air for the kiln and tertiary air for precalcining. The quantity of air used by the cooler 22 is sufficient and there is no excess quantity of air and then no heat must be given off into the atmosphere. In this way between 75 and 100 kcal/kg of energy can be saved. Furthermore, it is possible to dispense with filters and cleaning apparatus for the quantities of air which would otherwise be given off into the atmosphere. The gas (CO+ $H_2$) produced in the reactor meets the secondary air with a temperature of 1,000° C., whilst the secondary and tertiary air is at 750° C. approximately. Therefore the temperature of the flame can easily reach temperatures between 2,300 and 2,500° C. The burning process can be controlled much more easily due to this high temperature of the flame. Also the coating of the clinker which is necessary for the protection of the lining of the burning zone can be controlled much more simply.

Since the cement clinker in the reactor 23 is quenched by 200 to 250° C. within a few seconds only alite and belite crystallise. The only other constituent present is glass in which in particular $C_3A$, $C_4AF$, alkalis and magnesium oxide are bonded. Such a cement clinker could be designated as Glass Portland Cement.

The fuel ashes used in the gasification reaction do not have to be taken into account in the composition of the raw material. These ashes form a filler in the clinker. Pit coal and brown coal with high proportions of ash as well as coals with high volatile components can therefore be used. The fuel supplied to the reactor 23 does not have to be either dried or crushed and can be delivered in the form of 5 to 10 mm particles.

Due to the rapid quenching the calcium sulphates will not decompose and pass in the clinker as $CaSO_4$ (anhydrite).

This can have a result of reducing sulphur circulation problems in rotary kilns and substantially simplify the sulphur problem leading to the possibility of using fuels with higher sulphur content.

I claim:

1. A method for producing glass portland cement comprising burning portland cement clinker in a kiln; initially cooling the burnt clinker by mixing the burnt clinker with steam and fuel having pyrolysable components to form a mixture having a liquid phase; and pyrolysing said fuel to produce pyrolysis products having a sufficiently large endothermic reaction with the steam to quench the clinker and transform at least about 95% of the liquid phase into glass.

2. The method according to claim 1 wherein said fuel comprises a carbonaceous substance.

3. The method according to claim 1 wherein the rate of cooling the cement clinker is between 600K/min and 6,000K/min.

4. The method according to claim 1 wherein the initial cooling of the cement clinker is by approximately 200° C.

5. The method according to claim 1 wherein the initial cooling of the burnt cement clinker is from about 1,450° C. to about 1,250° C.

6. The method according to claim 1 including comminuting the cement clinker substantially simultaneously with the mixing of the latter with the fuel and steam.

7. The method according to claim 1 wherein the mixing of said clinker with said fuel and said steam causes gasification of said fuel.

8. The method according to claim 1 wherein gases produced by the pyrolyzation of said fuel are delivered to and burned in said kiln.

9. Apparatus for the industrial production of glass portland cement comprising a rotary kiln for receiving and burning portland cement clinker, said kiln having a discharge end; a reactor rotatable with said kiln for receiving burnt clinker; means for delivering pyrolysable fuel and steam to said reactor and mixing said fuel and steam with said burnt clinker, the mixing of said fuel and steam with said burnt clinker pyrolysing said fuel and cooling said clinker to form a liquid phase; and means for effecting further cooling of said clinker to a temperature at which at least about 95% of said liquid phase is transformed into glass.

10. Apparatus according to claim 9 wherein said reactor constitutes a part of said rotary kiln and has a diameter larger than that of said kiln.

11. Apparatus according to claim 9 wherein said reactor is positioned substantially immediately upstream from the discharge end of said rotary kiln.

12. Apparatus according to claim 9 including means for supporting said rotary kiln for rotation, said supporting means straddling said reactor.

13. Apparatus according to claim 9 wherein said fuel is carbonaceous.

14. Apparatus according to claim 9 wherein said fuel is a liquid.

15. Apparatus according to claim 9 wherein said fuel is gaseous.

* * * * *